United States Patent
Clymer et al.

(10) Patent No.: US 10,969,458 B1
(45) Date of Patent: Apr. 6, 2021

(54) SYSTEM AND METHOD FOR DIRECTION FINDING USING A NETWORKED ANTENNA ARRAY

(71) Applicant: BAE Systems Information and Electronic Systems Integration Inc., Nashua, NH (US)

(72) Inventors: Richard E. Clymer, Concord, NH (US); Luke D. St. Martin, Lunenburg, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 340 days.

(21) Appl. No.: 16/042,364

(22) Filed: Jul. 23, 2018

(51) Int. Cl.
| | | |
|---|---|---|
| *G01S 3/48* | (2006.01) | |
| *G01S 3/28* | (2006.01) | |
| *G01S 3/22* | (2006.01) | |
| *G01S 3/14* | (2006.01) | |
| *H04B 17/391* | (2015.01) | |
| *G01S 3/06* | (2006.01) | |

(52) U.S. Cl.
CPC ............... *G01S 3/48* (2013.01); *G01S 3/06* (2013.01); *G01S 3/146* (2013.01); *G01S 3/22* (2013.01); *G01S 3/28* (2013.01); *H04B 17/3912* (2015.01)

(58) Field of Classification Search
CPC ... G01S 3/48; G01S 3/146; G01S 3/22; G01S 3/28; G01S 3/023; H04B 17/3912
USPC ........................................................ 342/442
See application file for complete search history.

(56) References Cited

U.S. PATENT DOCUMENTS

| | | | | |
|---|---|---|---|---|
| 3,806,937 | A * | 4/1974 | Lindley ..................... | G01S 3/46 |
| | | | | 342/424 |
| 4,619,291 | A | 10/1986 | Shirian | |
| 5,321,410 | A * | 6/1994 | Hipp ........................ | G01S 3/52 |
| | | | | 342/442 |
| 7,233,285 | B2 | 6/2007 | Struckman | |
| 7,436,351 | B2 | 10/2008 | Struckman et al. | |
| 8,068,065 | B1 | 11/2011 | Struckman | |
| | | | (Continued) | |

FOREIGN PATENT DOCUMENTS

| | | | | |
|---|---|---|---|---|
| EP | 3215864 B2 * | 9/2017 | ............... | G01S 3/46 |
| EP | 3215864 B2 * | 7/2020 | ............... | G01S 5/04 |
| WO | WO-2016070931 A1 * | 5/2016 | ............... | G01S 5/12 |

OTHER PUBLICATIONS

"Comparison of Different Beam Forming Circuits" in IEEE MTT-S Latin America Microwave Conference (LAMC-2016) Puerto Vallarta, Mexico; Dec. 12-14, 2016 (Year: 2016).*

*Primary Examiner* — Vladimir Magloire
*Assistant Examiner* — Alexander L. Syrkin
(74) *Attorney, Agent, or Firm* — Sand, Sebolt & Wernow LPA; Scott J. Asmus (57) ABSTRACT

A system and method that can determine the direction of origin within 360 degrees around an antenna array for an emitted signal with a high degree of accuracy, even when the array is installed in a corrupted or "unclean" environment. Further, the provided system and method can provide a more accurate indication of direction despite polarization of the detected signal. Finally, the provided system and method can provide accurate results from phase measurements, amplitude measurements, or both phase and amplitude measurements, from an emitted signal where a phase network can be used to tailor the amplitude and phase variations versus spatial angle to best match the receiver measurement accuracies.

20 Claims, 2 Drawing Sheets

(56) References Cited

U.S. PATENT DOCUMENTS

| | | | |
|---|---|---|---|
| 8,264,408 B2* | 9/2012 | Kainulainen | G01S 3/023 |
| | | | 342/417 |
| 8,988,277 B2 | 3/2015 | Leise et al. | |
| 10,288,715 B2* | 5/2019 | Bowden | G01S 3/14 |
| 2006/0082501 A1* | 4/2006 | Chiang | G01S 3/48 |
| | | | 342/442 |
| 2006/0087475 A1* | 4/2006 | Struckman | G01S 5/04 |
| | | | 342/451 |
| 2011/0215963 A1* | 9/2011 | Perl | G01S 7/40 |
| | | | 342/156 |
| 2012/0026042 A1* | 2/2012 | Gooch | G01S 5/12 |
| | | | 342/442 |
| 2012/0127035 A1* | 5/2012 | Behdad | H01Q 3/36 |
| | | | 342/442 |
| 2013/0169485 A1* | 7/2013 | Lynch | G01S 3/46 |
| | | | 342/417 |
| 2017/0082722 A1 | 3/2017 | Kabel | |
| 2017/0223749 A1* | 8/2017 | Sheldon | H04B 7/0617 |

* cited by examiner

SYSTEM AND METHOD FOR DIRECTION FINDING USING A NETWORKED ANTENNA ARRAY

STATEMENT OF GOVERNMENT INTEREST

This present disclosure was made with United States Government support under Contract No. F33657-01-D-0026 awarded by the U.S. Air Force. The United States Government has certain rights in this disclosure.

BACKGROUND

Technical Field

The present application relates to a method of determining the source direction of an emitted signal. More particularly, the present application relates to a method of determining the source direction of an emitted signal utilizing an antenna array. Specifically, the present application relates to a method of determining the source direction of a detected signal utilizing a networked antenna array configured to receive and correlate both phase difference and amplitude of the emitted signal.

Background Information

The process of locating the source of an emitted signal, commonly known as direction finding, or DF, is common to many applications. For example, direction finding can be used in navigation, search and rescue, tracking wildlife, and locating illegal transmitters. In military applications, direction finding helps in target acquisition and tracking of enemy locations and movements. Nearly all modern militaries use some form of direction finding to guide their ships, aircraft, troops, and/or munitions in one or more ways.

Current methods for DF tend to detect and measure only the phase or only the amplitude of a signal, and these methods can be corrupted by polarization of the signal which in turn can reduce the accuracy and reliability of the results. Further, installation of receiving antenna arrays in "unclean" environments, such as installations on moving platforms and/or in environments where the antennas are obstructed by other structures or natural barriers, can cause measurement results that do not always match those expected for the source direction of the signal. Other unclean environments can include unfriendly environments where signals are intentional obstructed and/or subject to intentional interference.

Further, present methods of DF do not normally allow for optimization or adjustment of the phase or amplitude data. Instead, present implementations typically rely on a series of antennas that feed data directly into a receiver, where it can be correlated over spatial angles. Even systems that utilize amplitude data typically just compare the amplitude to a pre-established chart that could still be corrupted by the installation environment.

One prior method for DF, known as beam forming, can utilize amplitude difference data, but it is limited in that it requires specific beam form patterns that can only account for a small directional sector at a single time. Thus to scan a wide range, e.g. 180 degrees or 360 degrees, multiple specific scans must be performed over a period of time, which can slow the DF process.

SUMMARY

Issues continue to exist for DF systems in that they do not tend to utilize amplitude and phase difference data in tandem to determine the direction of origin for an incoming signal. The present disclosure addresses these and other issues by providing a system and method that can determine the direction of origin for an emitted signal with a high degree of accuracy, even when installed in a corrupted or "unclean" environment. Further, the system and method can provide a more accurate indication of direction despite polarization of the detected signal. Finally, the system and method can provide accurate results from phase measurements, amplitude measurements, or both phase and amplitude measurements, from an emitted signal.

In one aspect, the present disclosure may provide a method of direction finding using a phased array network having the steps of: calibrating an array comprising a plurality of antennas to detect one or more signals with an unknown direction of origin, the detected signals having one or more polarizations; networking the plurality of antennas within the array through a plurality of signal combining components; collecting phase difference data from the detected signal; collecting amplitude difference data from the detected signal; processing the collected phase difference data through the network of signal combining components; processing the collected amplitude difference data through the network of signal combining components applying a correlative interferometry direction finding process to the processed data; and assigning a correlation between the detected signal data and data contained within one or more stored databases of simulated signal data; generating a direction result from the correlation indicative of the direction of origin for the detected signal.

In another aspect, the present disclosure may provide a phased antenna array network including: a plurality of antennas arranged in a formation and operational to detect an incoming signal; a plurality of signal combining components in communication with the plurality of antennas and operational to receive incoming signal data from the plurality of antennas; at least one output from the plurality of combining components corresponding to each of the plurality of antennas; a phase difference logic to detect and find a phase difference between at least two antennas from the plurality of antennas; an amplitude difference logic to detect and find an amplitude difference between at least two antennas from the plurality of antennas; and, a direction finding logic to determine a direction from which the incoming signal was generated relative to the antenna array that determines the direction of the incoming signal based on outputs of the change in amplitude detected by the amplitude difference logic and the change in phase detected by the phase difference logic.

In another aspect, the present disclosure may provide a method of calibrating a phased antenna array network for multi-polarization signal detection having the steps of: installing the phased antenna array; emitting a first polarized signal towards the array at predetermined intervals around the array; recording the first polarized signal data as detected by the array; storing the recorded first polarized signal data in a database; emitting a second polarized signal towards the array at the same predetermined intervals around the array; recording the second polarized signal data as detected by the array; and storing the recorded second polarized signal data.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figures 1, 2:
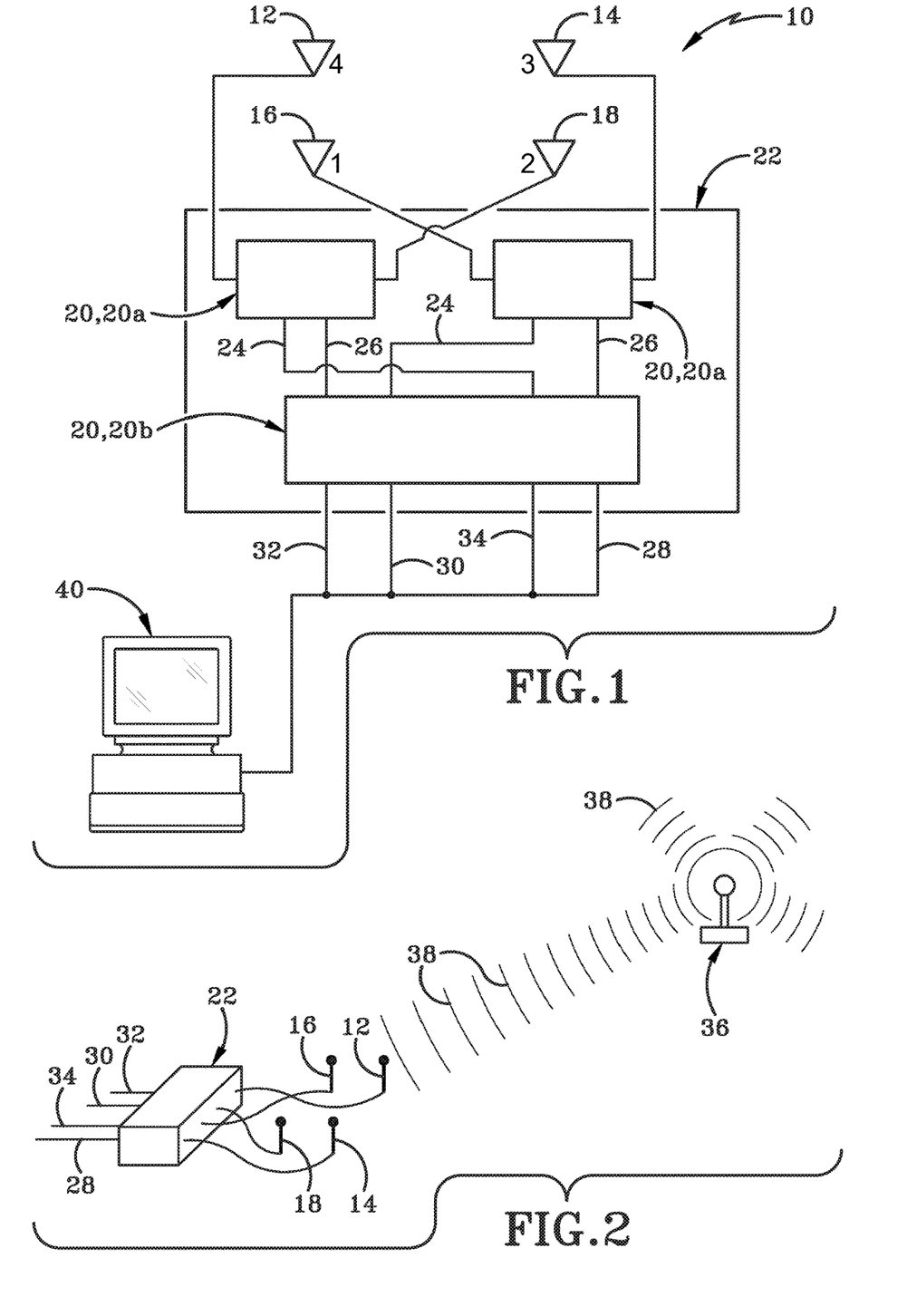
FIG. 1 is a block diagram of an exemplary four antenna array with a combining network.
FIG. 2 is a perspective view of an exemplary antenna array.

With reference to FIGS. 1 and 2, a phased antenna array 10 is shown having a plurality of antennas (shown and discussed herein as antenna 12, antenna 14, antenna 16, and antenna 18, or collectively as antennas 12-18), a plurality of signal combining components 20 forming a network 22, at least one output 28, 30, 32, and 34, corresponding to each of the combination of signals coming from the plurality of antennas 12-18, and a receiver 40 in serial connection with the outputs 28, 30, 32, and 34.

Antennas 12-18 can be monopole, dipole, or directional antennas. According to one aspect, the array 10 can utilize four monopole antennas 12-18 that have been calibrated, according to the method described herein, for polarized signals.

Although disclosed and discussed herein as four antennas arranged in a rectangular or square shaped pattern, it will be understood that array 10 can include any number of antennas as desired or dictated by the desired use and installation. According to one aspect, each of antennas 12-18 can be separate arrays having a plurality of antennas in each array. According to another aspect, array 10 can have two or more antennas arranged in any pattern appropriate for the desired installation. By way of non-limiting examples, array 10 can include two or more antennas arranged in a linear pattern, circular pattern, arc pattern, polygonal pattern, or any other suitable arrangement as determined by a person of skill in the art without deviation from the scope herein.

One or more antenna arrays 10 of the present disclosure can be installed in or on ships, aircraft (including both manned and unmanned aircraft), munitions (such as missiles), trucks or other land-based vehicles, or in stationary positions. Individual components, or the array 10 as a whole, can be miniaturized as necessary depending on the desired installation application without deviation from the scope herein.

Signal combining components, herein referred to as combiner(s), 20 can include one or more 0/90 phase combiners, one or more 0/180 phase combiners, or a combination thereof. According to one aspect, combiners 20 can be two 0/90 phase shifters and two 0/180 combiners. According to another aspect, phase shift combiners of any value can be utilized as appropriate for the desired installation.

It will be further understood that combiners 20 can include one or more amplitude shifters depending on the particular requirements of the desired installation. According to this aspect, combiners 20 can therefore be a plurality of phase shifters, a plurality of amplitude shifters, or a combination of phase and amplitude shifters as chosen by a person of skill in the art.

One or more of the plurality of combiners 20 can be in serial connection one or more of the remaining combiners 20 of array 10 to form network 22. Network 22 can be installed behind (downstream) antennas 12-18 and forward (upstream) of the receiver 40. Network 22 can accept input from the antennas 12-18 and can filter the input from antennas 12-18 through the combiners 20 to emphasize and/or enhance the input from one or more of the antennas 12-18 as desired for the specific installation environment.

Network 22 can include outputs 28, 30, 32, and 34 that can carry filtered data from combiners 20 to receiver 40. The operation of network 22 is further described below.

Receiver 40, shown and hereinafter referred to as computer 40, can alternatively be a logic controller, a series of logics or logic controllers, a microprocessor, or the like that can store and/or execute the process or processes disclosed herein. Although shown in direct (wired) connection with array 10, it will be further understood that computer 40 can be in communication with array 10 wirelessly through known data transmission protocols as determined by a person of skill without deviation from the scope herein.

According to one aspect, computer 40 can be or include a direction finding logic to determine a DF result based on the outputs 28, 30, 32, and 34 from network 22.

According to one aspect, a DF result can be an azimuth angle, an elevation angle, or both an azimuth and elevation angle. According to another aspect, a DF result can be a geolocation of the source of the detected signal.

Having thus described the structure of array 10, the operation of array 10 and its components will now be described.

In operation, with reference to FIG. 2, a phased array 10 having four vertically oriented monopole rods, or antennas 12-18, can be calibrated to determine the angle of origin for a detected incoming signal relative to the array 10 using the phase difference of measurements taken by each antenna 12-18. The array 10 can have the antennas 12 installed with a known distance between each individual antenna 12-18. When a wave front 38 from an incoming signal with an unknown source location 36 hits the array 10, the difference in phase of the wave front 38 when it hits the first antenna 12 and when the wave front 38 hits the other antennas 14-18 in the array 10 can be used to determine the direction of the incoming signal. The direction of origin for the wave front 38 produces a unique phase difference profile of the wave front 38 as it hits each of the antennas 12-18. Therefore, when utilizing a known configuration and distance between each of the antennas 12-18, the specific and unique phase difference profile can be used to determine the specific direction of origin of the wave front 38. By way of one non-limiting example, a wave front 38 originating from 5 degrees azimuth will give a unique phase difference profile. Then, the next time a wave front 38 is detected having the same unique phase difference profile, it can be determined that the wave front 38 originated from 5 degrees azimuth.

In stationary and "clean" (i.e. unobstructed or with no interference) environments, this setup can be both accurate and reliable. However, for other installations, such as on ships or in aircraft, i.e. "unclean" environments, measurements taken from these arrays do not always match the true source direction of the incoming signal. Thus, an array 10 must be calibrated for the specific and unique installation conditions.

Figure 3:
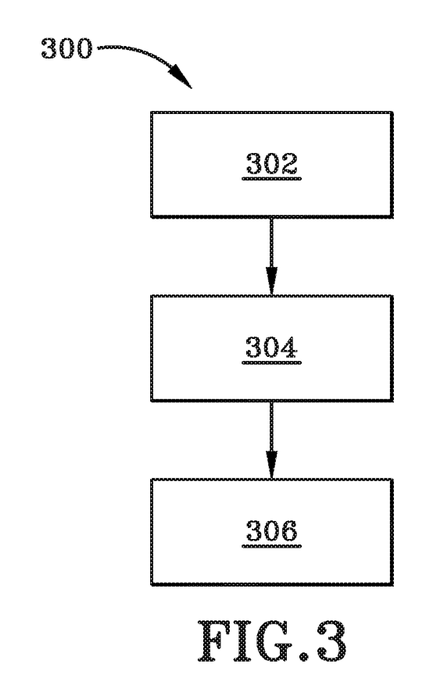
FIG. 3 is an exemplary flow chart for a method of calibration associated with the present disclosure.

With reference to FIG. 3, a calibration method 300 is shown as an exemplary flow chart. According to this method 300, calibration of the array 10 for the installation environment can be accomplished by first placing the array 10, or a facsimile thereof, in the corrupted, or unclean, environment—using the actual environment when using array 10 itself, or using a modelled or simulated environment when using a facsimile of array 10. A facsimile of array 10 can be created using 3-D modelling, scale models, partial installations, computer generated simulations, or other known modelling techniques. Occasionally, the only available option, or the best available option, is to provide an actual build of the installation environment itself. Providing the mock-up of the actual or simulated installation environment is indicated as step 302 in FIG. 3.

Step 304 can then be performed once the array 10 or facsimile is installed in the associated environment. According to this step 304, signals can be emitted towards the array 10 from a multitude of directions and the phase measurements taken by the array 10 can be recorded in a memory section of computer 40. Finally, once the signals emitted in step 304 are recorded, these recorded signal values can be stored in a database, indicated as 306. This database can be stored on a digital medium that is, or forms an operable portion of, computer 40.

Step 304 is commonly performed with vertically oriented (polarized) signals and can be done at any desired interval. By way of non-limiting example, signals can be emitted from positions every five degrees in azimuth and elevation around the array.

In real world applications, signals being detected by the array 10 are rarely perfectly matched to the array 10 in polarization. Instead, a detected signal with a differing polarization would be considered a corrupting factor which would lower the accuracy of the array 10 in DF. Despite the corruption introduced by a single polarization, a DF may still be able to be generated using an array 10 that has only been calibrated for a single polarization, e.g. vertical polarization.

To overcome corruption by polarized signals, a two- or multi-polarization scan can be performed provided the array 10 and antennas 12-18 have been properly calibrated for multiple polarizations. Although doing a plurality of calibrations 300 in all directions, vertical, horizontal, slant-left, slant-right, left hand circular, and right hand circular, is possible and would be the most accurate, often the addition of a single secondary polarization is sufficient to account for polarization corruption. Specifically, the addition of a horizontal polarization is typically sufficient.

In order to calibrate the array 10 and antennas 12-18 for a horizontal polarization, a second database can be created following the method 300 and steps 302-306 as used for creation of the vertical polarization database, however, each signal emitted at the mock-up of the installation during step 304 can be horizontally polarized in this secondary calibration. The data recorded then in step 304 shows how the horizontal signal affects the array 10 from each predetermined direction and these values are stored in a second database during step 306. The second database created in step 306 can likewise be stored on a digital medium that is, or forms an operable portion of, computer 40. According to one aspect, the second database can be stored on the same digital medium as the first database.

Alternatively, a second database need not be created. Instead, the data values obtained from the horizontal polarization calibration may be stored in the same database as the data from the vertical polarization. According to another aspect, if multiple polarization calibrations are performed in other directions, the data from each of these calibrations can be stored in a single database.

Electromagnetic waves have both phase and amplitude, each of which can be useful in DF, however, an array 10 of omni-directional monopole antennas, for example, which has been calibrated for both vertical and horizontal polarization according to the method above, predominately uses the phase difference of a signal. In some instances, this can be sufficient to provide a DF result, but DF can be more effective and accurate when both phase and amplitude variations are accounted for in the correlations. Accordingly, an array 10 that has been properly calibrated by method 300 for both vertical and horizontal polarization can be further arranged and networked to provide both phase and amplitude variations of the signal, thereby increasing the effectiveness of the array and the overall level of accuracy of the DF output.

According to one aspect, array 10 can provide phase difference data and amplitude difference data simultaneously, or in succession with either of phase or amplitude difference data delivered first and the remaining data delivered in succession.

To influence both phase and amplitude variation over spatial angle, the omnidirectional antennas 12-18 must be arranged and networked in a manner that provides directional amplitude data. First, the antennas 12-18 in the array 10 can be arranged with a known distance between each antenna 12-18. For purposes of this disclosure, the antennas 12-18 can be arranged in a square formation, however, any other antenna locations or arrangements can be used according to the specific installation conditions.

Once properly arranged, the antennas 12-18 can then be connected to network 22 which can enable filtering of the incoming voltage readings from antennas 12-18 through a series of combiners 20. Network 22 can allow for independent adjustments of both phase and amplitude enhancements to effectively hone the responses of the system and ultimately provide a more accurate DF result than using unaffected phase or amplitude results alone.

Further, network 22 can allow array 10 to have spatial angle specific amplitude differences between network 22 outputs 28, 30, 32, and 34. In keeping with the square embodiment, the antennas 12-18 can be networked such that antenna 12 can first be connected to one input of a two-port 2×2 combiner 20, which can be a 0/180 degree combiner. Antenna 18 would be connected to the other port of the same combiner 20. Antennas 14 and 16 can then be connected to a second 0/180 degree combiner 20. According to the square arrangement, the combined antennas 12 and 18 or 14 and 16 could be arranged diagonally opposite from each other such that each antenna connected to a single combiner 20 is spaced apart from the other antenna connected to the same combiner 20 in both a first and second direction, as shown in FIG. 1.

This arrangement can feed omnidirectional input from the antennas 12-18 into the 0/180 degree combiners 20a, which in turn deliver a first output 24 from each combiner 20a that represents the sum of the two antenna (12 and 18 or 14 and 16) inputs, while a second output 26 from each combiner represents the difference of the two antenna (12 and 18 or 14 and 16) inputs. The sum and difference data can then move into another combiner 20b, which can be a 0/90 degree phase shift. The network 22 can use two 0/180 degree combiners and two 0/90 degree phase shifts which can cause the omnidirectional difference pattern input from antennas 12-18 to be converted to four separate lobed output difference patterns. This can cause the array 10 to give four quadrant patterns, namely a first quadrant 1, a second quadrant 2, a third quadrant 3, and a fourth quadrant 4, as shown in FIG. 1, with four outputs representing gain in the forward left 28, gain in the forward right 30, gain in the aft-left 32, and gain in the aft-right 34. The data outputs 28, 30, 32, and 34 can now deliver phase and amplitude gradient data to computer 40, where an algorithm or process known as correlative interferometry direction finding ("CIDF" or "the CIDF process") can be applied and a DF result can be generated. CIDF is a known process which can determine a direction of origin for a detected signal. A more complete discussion of CIDF is described in US Pat. Pub. No. 2017/0082722A1, the entirety of which is hereby incorporated by reference as if fully re-written herein.

The use and placement of network 22 between antennas 12-18 and computer 40, can allow an operator to tailor the installation to adjust the amplitude gradient within the data from array 10, which can increase performance, which in turn can increase accuracy of the DF result. Further, network 22 can allow the use of monopole antennas 12-18 to provide instantaneous 360 degree DF capability that can be honed through use of combiners 20 to optimize performance in a specific quadrant. Specifically, the network 22 can be routed through different types and/or numbers of combiners 20 as chosen by a person of skill to optimize performance in a particular quadrant 1, 2, 3, and/or 4, or to enhance results for phase difference and/or amplitude difference. The ability to optimize network 22 for the specific installation parameters and conditions can provide a significant advantage over present systems using beam forming as these prior systems do not allow for instantaneous 360 degree DF capability.

Computer 40 can contain a series of logics, namely, a phase difference logic, amplitude difference logic, and a direction finding logic, which can operate in association to ultimately determine a DF result. Specifically, the phase difference logic can filter or otherwise mine the output data from array 10 to find a difference in phase between two or more of the antennas 12-18 of array 10. Likewise, the amplitude difference logic can filter or otherwise mine the output data from array 10 to find a difference in amplitude between two or more of the antennas 12-18 of array 10. The difference in phase and the difference in amplitude can then be utilized by the direction finding logic to determine and provide a DF result using the discriminatory variation to the phase and amplitude measurements given by the array 10 as it scans 360 degrees around the horizon for incoming signals.

Normally, without network 22, an array of monopole antennas 12-18 would give only phase difference data. Conversely, a directional antenna gives only amplitude data. By calibrating an array 10 for multiple polarizations and running the data through a network 22 as described above, a four monopole array 10 can generate both phase difference and amplitude difference data. Network 22 can further allow this phase and amplitude data to be optimized, as discussed above, to provide the highest performance of the array 10 to give a highly accurate, instantaneous, 360 degree DF result.

Figure 4:
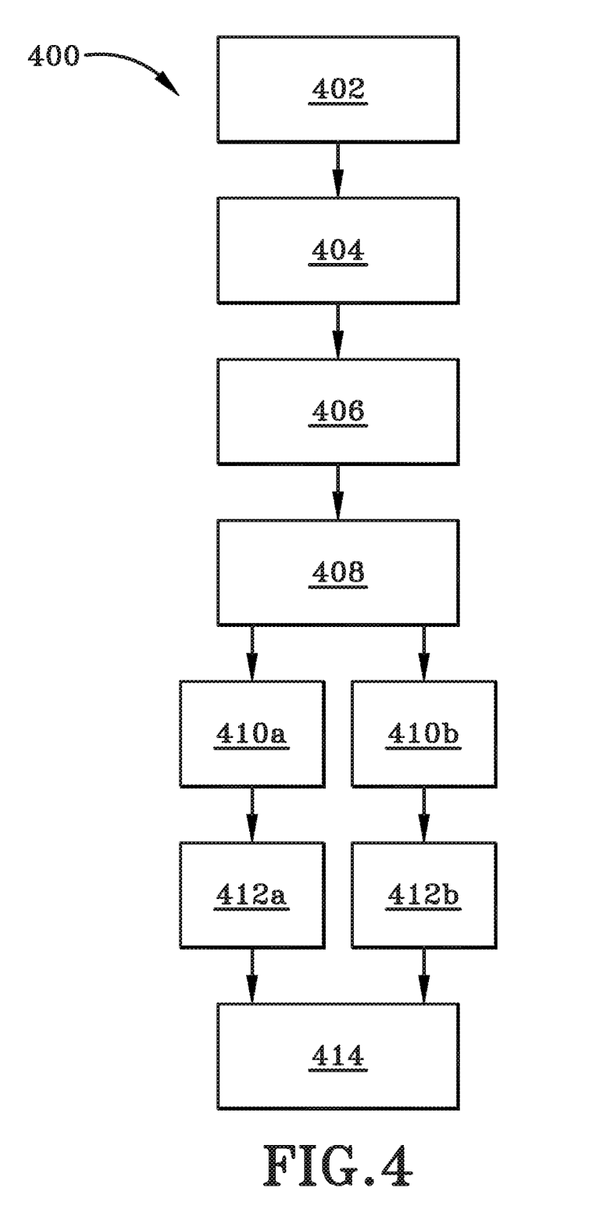
FIG. 4 is an exemplary flow chart for a method of use associated with the present disclosure.

Accordingly, in operation, generation of one exemplary DF result using an array 10 of monopole antennas 12-18 can be accomplished by following method 400 shown in the flow chart in FIG. 4. First, array 10 can be calibrated for both vertical and horizontal polarization, as described herein as method 300. This calibration step for operational method 400 is indicated as step 402. The second step, 404, is to connect the antennas 12-18 to the network 22 as previously described herein. Then, when an incoming signal with an unknown origin 36 is detected, the signal can be captured by the array 10 and filtered through the network 22 to provide both phase difference and amplitude difference data. The collection and transmission of data from the antennas 12-18 through network 22 and to computer 40 is indicated as step 406. Then, computer 40 can compare the data which was collected, processed, and transmitted in step 406 to the calibration database(s) created during calibration step 306, and apply the CIDF process to the data. The application of the CIDF process to the data is indicated in FIG. 4 as step 408.

Before the final DF result can be generated and reported (indicated as step 414), the CIDF process is first employed by computer 40 in step 408 to compare the incoming signal to both the vertical polarization database (step 410a) and/or to the horizontal polarization database (step 410b), and to assign a correlation to each. According to one aspect, comparison steps 410a and 410b can be done in either order, i.e. 410a followed by 410b or 410b followed by 410a, or can be performed simultaneously. If the correlations are higher when using the vertical database, the incoming signal is predominantly vertical, and that result should be reported, as step 412a. If the correlation is higher as compared to the horizontal database, the horizontal result should be reported as step 412b. By way of one non-limiting example, if the maximum vertical correlation determined in step 410a is 0.9 and the maximum horizontal correlation determined in step 410b is 0.95, then the horizontal result should be reported (412b). According to one aspect, as discussed above, the array 10 can be calibrated for any number of polarization angles; therefore, the comparison of the detected incoming signal to stored databases can utilize any number of polarization databases to match the calibration of array 10. Once the correlation is assigned and reported, a DF result can be generated and reported as step 414, thus completing method 400.

According to one embodiment, method 400 can be performed with an array 10 calibrated for single polarization. As discussed above, if a detected signal does not match array 10's polarization, this could be a corrupting factor, however, a DF result may still be able to be generated. According to this embodiment, method 400 may omit steps 410b and 412b, instead comparing the signal to the one calibration database and reporting the single result.

The correlation with either the vertical or horizontal database can, by itself, provide an indication of direction of the incoming signal. By way of one non-limiting example and according to one embodiment, if the signal data stored in the databases consists of recorded measurements taken every five degrees around the array 10 in the appropriate spatial angle direction (i.e. azimuth or elevation), an incoming signal may then most strongly correlate between 15 and 20 degrees azimuth, indicating a signal source between those angles. If the correlation values at 15 and 20 degrees are equal, the source is likely halfway between the angles, i.e. at 17.5 degrees azimuth. If the correlation is skewed to one side, for example the correlation at 15 degrees is 0.9 and at 20 degrees is 0.95, the signal likely originated from an angle skewed towards the 20 degree angle.

Amplitude difference and phase difference data from the network outputs 28, 30, 32, and 34, is fed into the CIDF process during step 408, which enables CIDF to provide an accurate and instantaneous 360 degree DF result as the phase difference data and the amplitude data are both used in the process. This combined use of amplitude difference and phase difference information provides optimal DF solutions. The network 22 can be designed to maximize amplitude and/or phase variations from the array 10 as a function of spatial angle to align with which parameter(s) (amplitude and/or phase) are most accurately measured in the receiver.

Method 400 allows flexibility to a DF system in that the CIDF process is operational and can provide a 360 degree DF result. Optimally using both amplitude and phase variations of the array network outputs can further translate to faster and more precise targeting and/or geolocation efforts. This can be invaluable in search and rescue operations and can save millions of dollars in wasted military munitions by increasing the accuracy of such munitions.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of direction finding using a phased array network comprising:
   calibrating an array comprising a plurality of antennas to detect one or more signals with an unknown direction of origin, the detected signals having one or more polarizations;
   networking the plurality of antennas within the array through a plurality of signal combining components;
   collecting phase difference data from the detected signal;
   collecting amplitude difference data from the detected signal;
   processing the collected phase difference data through the network of signal combining components;
   processing the collected amplitude difference data through the network of signal combining components;
   combining the collected amplitude difference data and the collected phase difference data to generate processed data for at least one output;
   applying a correlative interferometry direction finding process to the processed data;
   assigning a correlation between the detected signal data and data contained within one or more stored databases of simulated signal data; and
   generating an instantaneous direction result from the correlation indicative of the direction of origin for the detected signal.

2. The method of claim 1 further comprising:
   providing an unclean environment in which the array is installed prior to calibrating the array.

3. The method of claim 1 wherein the plurality of antennas further comprises:
   four omnidirectional monopole antennas.

4. The method of claim 3 wherein the plurality of signal combining components further comprises:
   two 0/180 degree combiners; and
   two 0/90 degree phase shifters.

5. The method of claim 4 further comprising:
communicating omnidirectional difference pattern data from the antennas to the plurality of signal combining components; and
converting the omnidirectional difference pattern data into lobed difference pattern data.

6. The method of claim 5 further comprising:
assigning a first correlation value to the difference between the detected signal data and the data contained within a stored database of simulated signal data having a first polarization.

7. The method of claim 6 further comprising:
assigning a second correlation value to the difference between the detected signal data and the data contained within the stored database of simulated signal data having a second polarization.

8. The method of claim 7 further comprising:
comparing the first correlation value and second correlation value and reporting only the data with the highest correlation value and disregarding the data with the lowest correlation value.

9. The method of claim 1 wherein the step of calibrating the array further comprises:
emitting a first polarized signal towards the array at predetermined intervals around the array;
recording the first polarized signal data as detected by the array;
storing the recorded first polarized signal data, wherein the stored signal data is stored in the one or more stored databases of simulated signal data;
emitting a second polarized signal towards the array at the same predetermined intervals around the array;
recording the second polarized signal data as detected by the array; and
storing the recorded second polarized signal data, wherein the stored signal data is stored in the one or more stored databases of simulated signal data.

10. A phased antenna array network comprising:
a plurality of antennas arranged in a formation and operational to detect an incoming signal;
a plurality of signal combining components in communication with the plurality of antennas and operational to receive incoming signal data from the plurality of antennas;
the plurality of signal combining components further comprising a network operable to filter voltages obtained from the incoming signal to detect a phase difference between at least two antennas from the plurality of antennas and detect an amplitude difference between at least two antennas from the plurality of antennas;
at least one output from the plurality of combining components corresponding to each of the plurality of antennas, wherein the at least one output contains the phase difference and the amplitude difference; and
a direction finding logic to determine a direction from which the incoming signal was generated relative to the antenna array that determines the direction of the incoming signal based on the change in amplitude and the change in phase of the incoming signal relative to the plurality of antennas;
wherein the array can instantaneously detect and determine the direction of origin of the incoming signal within 360 degrees around the array.

11. The antenna array of claim 10 wherein at least one of the signal combining components further comprises a 0/180 degree phase combiners and at least one of the signal combining components further comprises a 0/90 degree phase combiner.

12. The antenna array of claim 10 wherein the plurality of antennas further comprises four omnidirectional monopole antennas.

13. The antenna array of claim 12 wherein the plurality of signal combining components further comprises two 0/180 degree combiners and two 0/90 degree phase shifters.

14. The antenna array of claim 13 wherein the plurality of antennas communicate omnidirectional difference pattern data to the plurality of signal combining components.

15. The antenna array of claim 14 wherein the plurality of signal combining components convert the omnidirectional difference pattern data into lobed difference pattern data.

16. The method of claim 1, further comprising:
installing the phased antenna array;
emitting a first polarized signal towards the array at predetermined intervals around the array;
recording the first polarized signal data as detected by the array;
storing the recorded first polarized signal data;
emitting a second polarized signal towards the array at the same predetermined intervals around the array;
recording the second polarized signal data as detected by the array; and
storing the recorded second polarized signal data.

17. The method of claim 16, further comprising:
emitting more than two polarized signals towards the array;
recording the more than two polarized signals as detected by the array; and
storing the recorded more than two polarized signals in a number of databases equal to the number of the more than two polarized signals.

18. The method of claim 16 wherein the first polarized signal is vertically polarized and the second polarized signal is horizontally polarized.

19. The method of claim 18 wherein emitting the first polarized signal at predetermined intervals further comprises:
emitting the first polarized signal at intervals of five degrees around the array; and
wherein emitting the second polarized signal at predetermined intervals further comprises:
emitting the second polarized signal at intervals of five degrees around the array.

20. The method of claim 18 wherein installing the array further comprises:
simulating the installation of the array through use of one of scale models, partial installations, 3-D modeling, and computer-generated simulations.

* * * * *